Oct. 28, 1969

HIROSHI SUZUKI ET AL 3,474,611

METHOD OF MAKING FIBROUS YARNS AND APPARATUS THEREFOR

Filed Aug. 31, 1967

INVENTORS
HIROSHI SUZUKI, TOSIO HUJIMORI
AND SABURO IDA
BY
McGlew and Toren
ATTORNEYS

United States Patent Office 3,474,611
Patented Oct. 28, 1969

3,474,611
METHOD OF MAKING FIBROUS YARNS AND APPARATUS THEREFOR
Hiroshi Suzuki, Nagoya-shi, Tosio Hujimori, Aichi-ken, and Saburo Ida, Nagoya-shi, Japan, assignors to Mitsubishi Jukogyo Kabushiki Kaisha, Tokyo, Japan
Filed Aug. 31, 1967, Ser. No. 664,721
Claims priority, application Japan, Sept. 5, 1966, 41/58,592
Int. Cl. D02g 3/06, 3/08; B26f 1/24
U.S. Cl. 57—31   6 Claims

ABSTRACT OF THE DISCLOSURE

Fibrous yarn formed from film and yarn material made of polypropylene and the like is produced by conveying the material at a predetermined tension past a splitting device comprised of a plurality of needle-shaped splitting elements extending radially or angularly outwardly from a drum. The speed of the drum can be varied relative to the speed of travel of the material to regulate the length of the splits formed. Moreover, the duration of contact of the material with the splitting device can be varied by angularly orienting the path of travel of the material about the drum.

---

The present invention relates generally to the manufacture of fibrous yarns and particularly to methods of splitting one or more films or yarns, for example, polypropylene, polyester or polyethylene, to obtain fibrous yarns especially suited to the making of articles such as bags for holding cereal of the like particulate material, carpets and knitwear and to apparatus for performing such methods., In general, a uniaxially oriented film of thermoplastic polymer is inherently higher in strength in the axial direction and easily tearable in the direction parallel to the axis.

Making use of the above nature of such polymer film or yarn, the present invention provides a simplified and less expensive method of and apparatus for splitting the film or yarn while it runs under a predetermined tension thereby to provide fibrous yarns which can readily be made into fine meshed and regular network structures.

An object of the present invention is to produce fibrous yarns by readily splitting one or more thermoplastic films or yarns into fine meshed and regular network structures in an efficient manner during its travel by placing it in contacting engagement with a splitting drum having projections formed on its circumferential peripheral surface and which rotates at a peripheral speed equal to or more or less differing from the travelling speed of the film or yarn.

According to the present invention the travelling films or yarns are held in contact with a drum having splitting projections formed on its peripheral surface and rotating at a peripheral speed equal to or differing from the traveling speed of film or films on the yarn or yarns, as described above, and even in case these speeds are equal to each other, there exists some difference in speed between films or yarns and the projections as will be hereafter explained so that each of the projections may act to form in the web a longitudinal slit of the length corresponding to the speed difference. In other words, the splitting of films or yarns can be effected even where the speed of films or yarns and a splitting drum are equal to each other. On the other hand, where some difference in speed exists between films or yarns and the splitting drum, it will readily be understood that the length of slits formed in the film or yarn can be freely varied by changing the speed differences.

The same effect can be obtained also by increasing or decreasing the angle of engagement of the films or yarns with the splitting drum.

It will be appreciated from the foregoing statement that, according to the present invention, the thermoplastic film or yarn can be efficiently split into the fine meshed and regular network structures by an extremely simple method of running films or yarns in contact with a special splitting drum under a predetermined tension while maintaining contacting engagement therewith and thus a desired fibrous yarn can be produced without necessitating any complicated process including the large number of steps as required in the prior art.

Another object of the present invention is to provide an apparatus for making novel fibrous yarns from one or more films or yarns and which is extremely simple in construction including two sets of nipping rolls arranged to cause the film or yarn to travel therebetween under a predetermined tension, and a splitting drum located in an intermediate position between the two roll sets and provided on its peripheral surface with a large number of splitting projections, which drum is rotatable at a speed equal to or differing from the travelling speed of the film or yarn while being maintained in contact with the latter.

According to the present invention, there is provided an apparatus for making fibrous yarns from one or more thermoplastic films or yarns and which comprises two sets of nipping rolls arranged to cause the film or yarn to travel therebetween under a predetermined tension, a splitting drum is positioned intermediate said two roll sets so as to maintain contact with the film or yarn at a given engagement angle and having splitting projections regularly arranged on the peripheral surface, and means for driving said splitting drum at a peripheral speed selected relative to the travelling speed of the film or yarn so as to be equal to or different from the latter speed.

In the operation of the apparatus of the present invention, a drum having splitting projections regularly arranged on its peripheral surface is driven to rotate at a peripheral speed equal to or differing from the speed of the film or yarn travelling under a predetermined tension while maintaining contact with the drum so that the projections on the splitting drum engaging the film or yarn can act to form therein longitudinal slits of a predetermined length at predetermined intervals. In this manner, fibrous split yarns of a uniform and nonfluffy structure can be produced with efficiency simply by driving the splitting drum of simple construction according to the present invention. In addition, the splitting operation can be controlled to furnish any network pattern appropriate to the following process to which the product is to be subjected simply by varying the speed of rotation of drum and selecting an appropriate spaced arrangement of the projections on the drum surface.

Also, the projections on the peripheral surface of the splitting drum may take a straight needle form and be arranged at regular intervals along predetermined lines of lead which proceed in operation in the direction of the axis of rotation of the drum. With this arrangement, the predetermined network pattern can be formed regularly in films or yarns during its travel over a splitting drum.

In this manner, it will be recognized that fibrous yarns of any network suited to the following process can be made on an apparatus of simple construction and at reduced cost.

Furthermore, the projections on the splitting drum may be of a needle-like form curved in an involute shape and set to slope with their pointed end directed to extend in the direction of rotation so as to penetrate the running films or yarns extremely smoothly. With this arrangement, it will be recognized that the film or yarn can be formed with especially neat splits of an appropriate configuration to give desired fibrous yarns.

These and other objects, features and advantages of the present invention will become apparent from the following description when taken in conjunction with the accompanying drawings, which illustrate some preferred embodiments of the invention, and in which.

Figure 4:
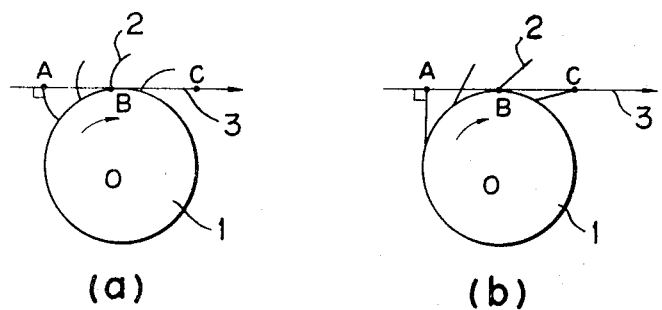
Figure 5:
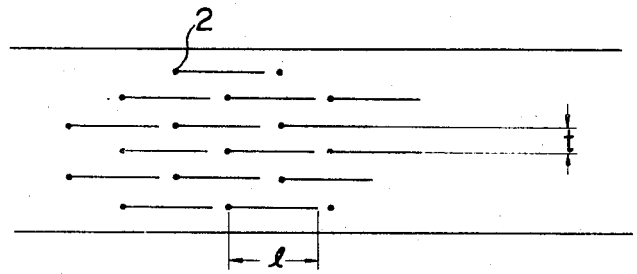
Figure 6:
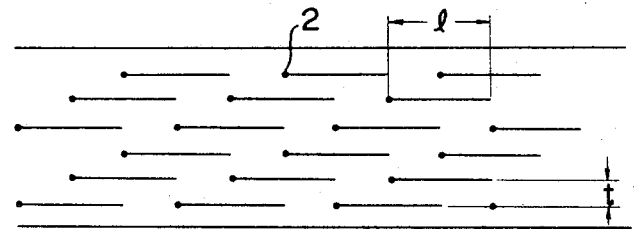

FIGS. 4(a) and 4(b) illustrate the manner in which film or yarn is moved into and out of contacting engagement with the respective splitting drums having different forms of projections; and FIGS. 5 and 6 schematically illustrate different configurations of split network pattern of respective lengths on an enlarged scale.

Referring to the drawings, numeral 1 designates a splitting drum carrying splitting projections 2 on its peripheral surface and driven by suitable means 7 such as an electric motor. As shown, the drum 1 is in contact with at least one film or yarn 3, for example, of polypropylene and of 1000 denier, and is driven by an appropriate means to rotate at a peripheral speed either equal to or more or less differing from the travelling speed of the film or yarn 3. Each of the projections 2 is of a needle or the like form straight or curved in an involute and preferably is set to slope with its pointed end extending in the direction of the axis of rotation of the drum. The projections 2 are arranged on the peripheral surface of the splitting drum 1 along predetermined lines of lead 4 which proceed in the direction of the axis of rotation of the drum as the latter is driven to rotate. The spacing pitch $p$ between two aligned projections 2 arranged on adjacent lines of lead 4 is determined in accordance with the desired splitting pattern or split configuration.

Figure 1:
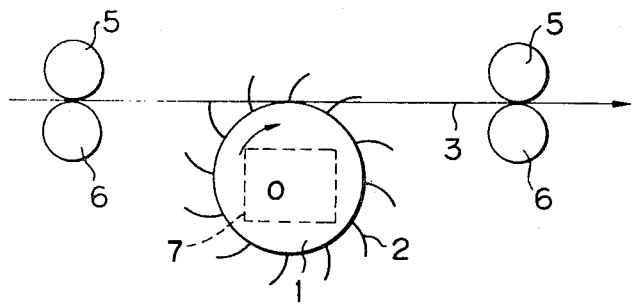
FIG. 1 is a side elevation of an illustrative example of the invention which shows a splitting drum and a film or yarn extending straight in engagement therewith.
Figure 2:
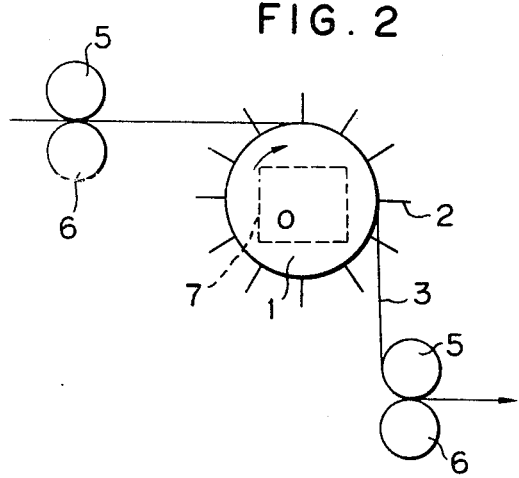
FIG. 2 is a view similar to FIG. 1 showing films or yarn extending over the drum with an increased angle of engagement.

Film or yarn 3, which runs in contact with the splitting drum 1, may be arranged to extend in a straight line, as shown in FIG. 1, or to extend around the drum surface at an increased angle of engagement, as shown in FIG. 2. In the case of FIG. 1 the arrangement is made to allow the distance between the axis O of the splitting drum 1 and the film or yarn 3 to be freely varied as required between a minimum corresponding to the radius of a drum 1 and the maximum workable radial distance of the projections 2 plus the drum radius. In the case of FIG. 2, the distance between the drum axis and film or yarn extending around the drum surface is fixed but the angle of engagement therebetween is variable, as will be apparent from the following description.

Figure 3:
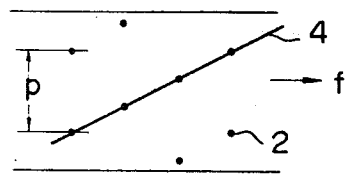
FIG. 3 illustrates one arrangement of splitting projections set on the peripheral surface of a splitting drum.

Provided in front of and behind the splitting drum 1 are respective sets of nipping rolls 5 and 6 which serve to drive the film or yarn 3 under a predetermined tension, to maintain the film or yarn being split in a contact position relative to the projections 2, and to drive the film or yarn 3 along a predetermined path. In FIG. 3, the arrow $f$ indicates the direction of travel of film or yarn 3, and in FIG. 4, reference characters A, B and C represent the point of contact of the film or yarn with the projections 2, the point of contact between the film or yarn and the drum surface, and the point at which the film or yarn is released from the projections, respectively. In FIGS. 5 and 6, reference character $l$ indicates the length of each of the slits formed by projections 2 and reference character $t$ indicates the width of filaments each defined between adjacent splits.

In the splitting operation, when the film or yarn 3 engages the splitting drum 1 carrying projections 2, it starts at point A indicated in FIGS. 4(a) and 4(b) to contact the pointed end of the projections 2. In order to facilitate the starting of the splitting action at this point of contact A, it is desirable to set the projections 2 so that they start to engage the film or yarn 3 approximately at right angles thereto. As the film or yarn 3 continues to proceed with rotation of the splitting drum 1, the projections 2 thereon penetrate the film or yarn 3 and subsequently acting to split it proceed past the point of contact B to reach the point of contact C where the projections 2 are released completely from the film or yarn 3. In this splitting process effected along the path of film or yarn including points A, B and C, it will be noted that some difference in speed always exists between the yarn or film 3 and the projections 2 engaging therewith during the passage of the film or yarn 3 from C to B or from B to A even if, at point B where yarn or film 3 comes the closest to the drum 1, the film or yarn and the drum surface proceed at the same speed.

Though the embodiments shown have been designed to obtain the desired network fibrous yarns from a 1000 denier film of polypropylene or similar polymer material by causing the film to run under a fixed tension and in contacting engagement with the splitting drum 1, it will be appreciated that any film formed of polypropylene, polyester or the like polymer can be fed directly to the splitting drum 1 for network, eliminating the need of any cutter, comber, gill or other preprocessing unit previously required, thereby obtaining fibrous yarns which are usable in making textile articles such as carpets and knitwear after they have been subjected to such aftertreatment as crimping, for example, using a crimper box, pre-twisting or bulky treatment.

Further, it is to be noted that any fibrous yarns, having desired physical properties and suited to the subsequent process to which the material is to be subjected, can be obtained by selecting a film material of appropriate thickness and width and selecting an appropriate arrangement of splitting projections on the drum and a proper relationship between the speed of film travel and that of drum rotation to give a desired slit length $l$ and a desired filament width $t$ (see FIGS. 5 and 6).

Furthermore, by changing the engagement angle that film or yarn forms with the splitting drum, as shown in FIG. 2 in which said angle is increased, the same effects as in the embodiment illustrated in FIG. 1 can favorably be obtained and moreover the slit length $l$ can advantageously be varied.

It is also to be noted that fibrous yarns obtained in the above-described examples of the present invention is quite a novel product which takes the form of multiple-filament yarn especially usable as a material, for example, for bags intended to hold cereal or other particulate material without the need of any further processing steps such as crimping and pretwisting referred to hereinbefore.

In addition, it will be readily appreciated that the present invention can be applied with particular advantages to various techniques including the manufacture of stretch tape and the tape winding or twisting techniques.

What is claimed is:

1. A method of making fibrous yarn from film and yarn material formed of polypropylene, polyester, polyethylene and the like and comprising the steps of transporting the material along a path of travel under a predetermined tension, longitudinally splitting the material in its path of travel by employing rotatable splitting elements intersecting the path of travel and forming discontinuous slits in the material, rotating the splitting elements at a speed relative to the speed of travel of the material for regulating the length of the slits formed in the material, and varying the angle of contact of the axis of the path of travel of the material with the splitting elements for regulating the duration of the period of contact of the material with the splitting elements.

2. An apparatus for making fibrous yarn from film and yarn material formed of polypropylene, polyester, polyethylene and the like and comprising rolls spaced apart for transporting the material along a path of travel under a predetermined tension, splitting means located between said rolls for longitudinally splitting the material in the course of its path of travel, said splitting means comprising a rotatable drum having its axis of rotation disposed substantially perpendicularly to the direction of the path of travel of the material and being offset from the path of travel, a plurality of splitting elements fixed to and extending outwardly from the circumferential periphery of said drum and intersecting the path of travel of the material, said splitting elements being spaced apart in the circumferential and axial direction of said drum and being disposed in a plurality of axially extending rows about the circumferential periphery of said drum with said splitting elements in adjacent rows being offset in the axial direction relative to one another, said splitting elements having a needle-like shape and extending radially outwardly from said drum, and means for moving said splitting elements at variable speeds relative to the speed of the material for regulating the length of the slits formed in the material.

3. An apparatus, as set forth in claim 2, wherein said drum being arranged with its periphery in part disposed contiguous to the path of travel of the material, and the positions of said rolls relative to said drum forming an angularly disposed path of travel for the material wherein the path of travel from said roll upstream from said drum to said drum is angularly disposed with respect to the path of travel from said drum to said roll located downstream from said drum.

4. An apparatus, as set forth in claim 2, wherein said splitting elements are disposed in a plurality of lines of lead extending about the circumferential periphery of said drum, and said lines of lead being disposed obliquely to a plane extending through said drum perpendicularly to the axis of rotation thereof.

5. An apparatus for making fibrous yarn from film and yarn material formed of polypropylene polyester, polyethylene and the like and comprising rolls spaced apart for transporting the material along a path of travel under a predetermined tension, splitting means located between said rolls for longitudinally splitting the material in the course of its path of travel, said splitting means comprising a rotatable drum having its axis of rotation disposed substantially perpendicularly to the direction of the path of travel of the material and being offset from the path of travel, a plurality of splitting elements fixed to and extending outwardly from the circumferential periphery of said drum and intersecting the path of travel of the material, said splitting elements being spaced apart in the circumferential and axial direction of said drum, said splitting elements having a needle-like shape and extending angularly outwardly from said drum with the outer ends of said splitting elements extending in the direction of rotation of said drum and being arranged at substantially right angles to the material at the initial point of contact therebetween, and said splitting elements at the point of contact with said drum forming an acute angle with a tangent to said drum extending the point of tangency in the direction of travel of the material.

6. An apparatus, as set forth in claim 5, wherein said splitting elements have a curved, involute configuration.

References Cited
UNITED STATES PATENTS

| | | | |
|---|---|---|---|
| 2,706,834 | 4/1955 | Wilkie | 19—.37 XR |
| 2,853,741 | 9/1958 | Costa et al. | |
| 2,856,641 | 10/1958 | Plassa et al. | 19—115 |
| 3,199,284 | 8/1965 | Scragg | 57—167 XR |
| 3,273,771 | 9/1966 | Beaumont. | |
| 3,302,501 | 2/1967 | Greene. | |
| 3,369,435 | 2/1968 | Boultinghouse | 83—30 |

JORDAN FRANKLIN, Primary Examiner

WERNER H. SCHROEDER, Assistant Examiner

U.S. Cl. X.R.

28—1; 57—167; 83—30; 225—3, 97